(12) United States Patent
Osawa et al.

(10) Patent No.: US 7,735,391 B2
(45) Date of Patent: Jun. 15, 2010

(54) STEERING DEVICE

(75) Inventors: Toshihito Osawa, Gunma-ken (JP);
Masayuki Imai, Gunma-ken (JP)

(73) Assignee: Yamada Manufacturing Co., Ltd.,
Kiryu-shi (JP)

( * ) Notice: Subject to any disclaimer, the term of this patent is extended or adjusted under 35 U.S.C. 154(b) by 497 days.

(21) Appl. No.: 11/396,613

(22) Filed: Apr. 4, 2006

(65) Prior Publication Data

US 2006/0243084 A1 Nov. 2, 2006

(30) Foreign Application Priority Data

Apr. 18, 2005 (JP) .............................. 2005-120411

(51) Int. Cl.
*B62D 1/18* (2006.01)
(52) U.S. Cl. ........................................ 74/493; 280/775
(58) Field of Classification Search .................... 74/493, 74/492; 280/775
See application file for complete search history.

(56) References Cited

U.S. PATENT DOCUMENTS 5,338,064 A * 8/1994 Sadakata et al. ............ 280/775
6,450,531 B1 * 9/2002 Rinker et al. ................ 280/775
2006/0151984 A1 * 7/2006 Higashino et al. ........... 280/775

FOREIGN PATENT DOCUMENTS

| JP | 1-62169 | | 3/1989 |
| JP | 0200575183 A | * | 3/2005 |
| WO | WO 2005/021355 A1 | | 3/2005 |

* cited by examiner

*Primary Examiner*—Thomas R Hannon
*Assistant Examiner*—Terence Boes
(74) *Attorney, Agent, or Firm*—McGinn IP Law Group, PLLC (57) ABSTRACT

To provide a steering device for tilt and telescopic adjustments in which the locked condition can be made stronger, and when unlocked, tilt and telescopic adjustment can be smoothly carried out.

A steering device, comprising: a fixed bracket having fixed side parts on both sides in the width direction; a movable bracket arranged between the fixed side parts; a friction plate fixed and oppositely arranged with a suitable gap with respect to at least one of the two fixed side parts of the fixed bracket; and a friction washer that is inserted between the fixed side part and the friction plate. A lock bolt passes through for connecting the fixed bracket, the movable bracket, the friction plate, and the friction washer to be freely locked and unlocked.

17 Claims, 10 Drawing Sheets

STEERING DEVICE

BACKGROUND OF THE INVENTION

1. Field of the Invention

The present invention relates to a steering device for tilt and telescoping adjustments, particularly to a steering device in which the locked state can be made stronger, and when carrying out tilt and telescopic adjustments in the unlocked state the operation can be made smoother.

2. Description of the Related Art

Conventionally there are steering devices provided with a mechanism for tilt and telescopic adjustments. The common structure of this type of steering device includes a fixed bracket fixed to the vehicle body, and a movable bracket provided with a steering column. The movable bracket is fitted to the fixed bracket so that the movable bracket can pivot, move in the forward and backward directions, and be freely fixed. The movable bracket is normally sandwiched between the fixed bracket.

Locking the fixed bracket and the movable bracket is carried out using a fastener such as a bolt and nut, or similar. When carrying out tilt and telescopic adjustments the lock of the movable bracket to the fixed bracket is temporarily released, and the position of the steering wheel is adjusted to suit the stature of the driver. Then after setting the steering wheel in a suitable position, the movable bracket is again locked to the fixed bracket. Locking and releasing is carried out using a locking lever installed near the steering wheel.

SUMMARY OF THE INVENTION

In this type of steering device provided with a tilt and telescopic adjustment mechanism, after making the tilt and telescopic adjustment while the lock between the fixed bracket and the movable bracket is released, when the steering device is again locked it is essential that it is securely locked. Therefore the fastening torque applied by the locking lever to the fastening adjustment fitting is made larger. However, if too large a tightening torque is necessary the locking lever operation becomes difficult. Therefore a steering device that can be locked sufficiently strongly without increasing the tightening torque is disclosed in Japanese Utility Model No. H1-62169.

The following is a simplified explanation of the technical content of Japanese Utility Model No. H1-62169, using the same labels as used in that document. The steering device includes a steering column 1; a column bracket 5 integral with the steering column 1; a body bracket 7 fixed to the vehicle body as well as fitted to the column bracket 5; and a fastening bolt 9 that passes successively through the column bracket 5 and the body bracket 7. Also, the fastening bolt 9 is changed from the locked condition to the released condition by a tilt lever 10, so that the angle of the steering column 1 can be adjusted in the vertical direction.

Either the column bracket 5 or the body bracket 7 is provided with a plate shaped part, and the other is provided with a fork shaped part that sandwiches the plate shaped part, and the two parts are fastened by the fastening bolt 9. The fork shaped part is made from a friction plate 12, and the friction plate 12 is formed integrally with the either the body bracket 7 or the column bracket 5. When the fastening bolt 9 is fastened, the surfaces of a vertical part 7b of the body bracket 7 and the column bracket 5 and the friction plate 12 are pressed inwards, and when the lock is released by the locking lever 10 even though the fastening of the fastening bolt 9 is released, deformation remains on the side surface parts due to a small inward return.

Also, plate thicknesses and materials differ, but between the column bracket 5 of the steering column 1 and the friction plate 12 the vertical part 7b of the body bracket 7 which is a separate member is sandwiched and held, so the return angle of the respective side surfaces can be different. Therefore, when the tilt lever 10 releases the locked state so that tilt movements can be made, deformation due to the return remains, so the surfaces that are in mutual confrontation with each other are in mutual contact with each other and press against each other, and as a result of the effect of the friction force a resistance to tilt movement occurs, and the operation feeling is poor. It is an object of the present invention to provide a sufficiently strong lock with a normal torque, in a very simple structure, and to provide very good operation feeling for the tilt movement with a very simple structure.

Therefore, as a result of dedicated research to solve the above problems, the inventors solved the problem with the steering device of the invention according to claim 1, which includes a fixed bracket having fixed side parts on both sides in the width direction; a movable bracket arranged between the fixed side parts; a friction plate fixed and oppositely arranged with a suitable gap with respect to at least one of the two fixed side parts of the fixed bracket; and a friction washer that is inserted between the fixed side part and the friction plate, wherein a lock bolt passes through the fixed bracket, the movable bracket, the friction plate, and the friction washer, connected so that the bolt can be freely locked and unlocked.

The invention according to claim 2 solves the problem with a steering device according to the above configuration, wherein the part of the friction plate below the position of attachment separates elastically from the fixed side part when the lock of the lock bolt is released. The invention according to claim 3 solves the problem with a steering device according to the above configuration, wherein the upper edge of the friction plate is mated and fixed to the upper part of the fixed side part. The invention according to claim 4 solves the problem with a steering device according to the above configuration, wherein the plate thickness of the friction plate is thinner than the plate thickness of the fixed side part.

The invention according to claim 5 solves the problem with a steering device according to the above configuration, wherein the friction plate and the friction washer are provided on both fixed side parts of the fixed bracket. The invention according to claim 6 solves the problem with a steering device according to the above configuration, further comprising a collar member provided between the two movable side parts of the movable bracket. The invention according to claim 7 solves the problem with a steering device according to the above configuration, wherein a positioning projection is formed to correctly position the friction washer. The invention according to claim 8 solves the problem with a steering device according to the above configuration, wherein a washer is arranged on the outer surface of the friction plate, so that the friction plate is sandwiched between the friction washer and the washer.

According to the invention of claim 1, by inserting the friction washer between the friction plate and the fixed side part of the fixed bracket, the friction plate is sandwiched. Therefore when these components are fastened by the lock bolt, the pressure contact friction force is effectively increased by the axial force of the lock bolt. Therefore the retention force can be improved. Also, when making tilt movements there is no contact or pressure between surfaces, so a good operation feeling is maintained. Also, by increasing the diameter of the friction washer still further, the retention forces can be stabilized.

According to the invention of claim 2, the part of the friction plate lower than the location where the friction plate is fixed separates elastically from the fixed side part when the lock of the lock bolt is released, so the friction plate and the friction washer do not contact each other with pressure. In this condition the movable bracket can move smoothly relative to the fixed bracket, particularly when making telescopic adjustments, so the adjustment feeling can be very good.

According to the invention of claim 3, the top edge of the friction plate is aligned with the upper part of the fixed side part and fixed. Therefore in assembly operations in the factory, the friction washer is inserted between the fixed side part and the friction plate from the lower part of the fixed bracket, so there is no obstruction to inserting the friction washer, insertion is made easier, and the operational efficiency can be improved. Next, according to the invention of claim 4, the plate thickness of the friction plate is thinner than the plate thickness of the fixed bracket, so there is good pressure contact between the friction plate and friction washer when locked by the lock bolt, so the fixing can be very strong.

According to the invention of claim 5, the friction plate and the friction washer are provided on both fixed side parts of the fixed bracket. Therefore, on both sides of the fixed bracket and the movable bracket in the width direction, the fastening force of the friction plate, friction washer, and lock bolt can act. Therefore an even stronger locked condition can be obtained. Also, according to the invention of claim 6, a collar member is provided between the two movable side parts of the movable bracket. Therefore the movable bracket is reinforced by the collar member in the width direction, so the movable bracket may be made from relatively thin metal, which contributes to weight reduction.

Next, according to the invention of claim 7, projections are provided to locate the friction washer in the correct position. Therefore the friction washer can be simply dropped between the friction plate and the fixed side part, and the friction washer will be positioned in the correct position in the gap between the friction plate and the fixed side part, so assembly operations can be efficiently carried out. According to the invention of claim 8, a washer is used together with the friction washer. Therefore, the fastening force on the plate shaped part can be made even stronger. Furthermore, the material and size of the washer and the friction washer can be made the same, so productivity can be improved, and therefore cost can be reduced.

BRIEF DESCRIPTION OF THE DRAWINGS

FIG. 3A is a side view of the fixed side part to which the friction plate is fixed, 3B is a side view of the fixed side part, 3C is a side view of the friction plate;

FIG. 7A is an enlarged vertical section front view showing the lower part of the friction plate separated from the fixed side part, 7B is an enlarged vertical section front view in the lock released condition;

DESCRIPTION OF THE PREFERRED EMBODIMENTS

Figure 1A:
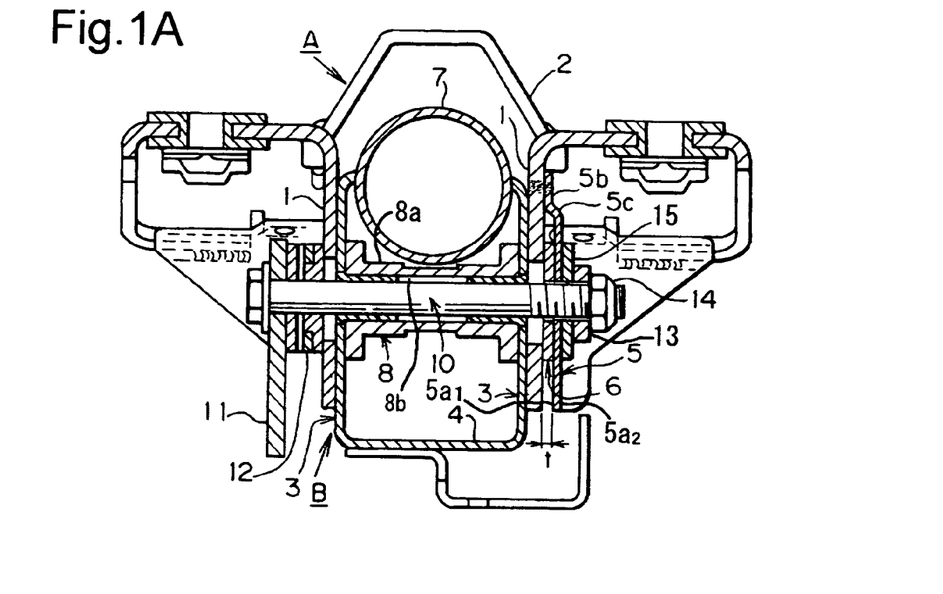
FIG. 1A is a vertical section of the front of the present invention, 1B is an enlarged view of part of 1A.
Figures 3A, 3B, 3C:
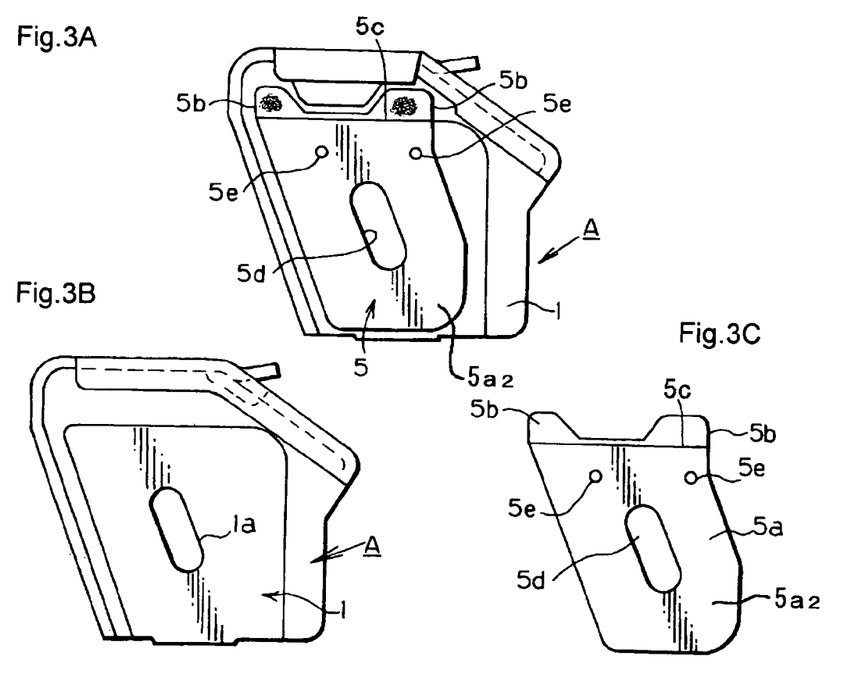

The following is a description of the preferred embodiments of the present invention, based upon the drawings. First, as shown in FIGS. 1A, 3, and elsewhere, the configuration of the present invention includes mainly a fixed bracket A, a movable bracket B, a friction plate 5, a friction washer 6, and a lock bolt 10. The fixed bracket A includes a pair of fixed side parts 1, 1 that are oppositely arranged in the width direction, and an installation head part 2. The fixed side parts 1, 1 are substantially plate shaped, and the installation head part 2 is fixed to the top edges of the two fixed side parts 1 that are oppositely arranged.

Figure 2A:
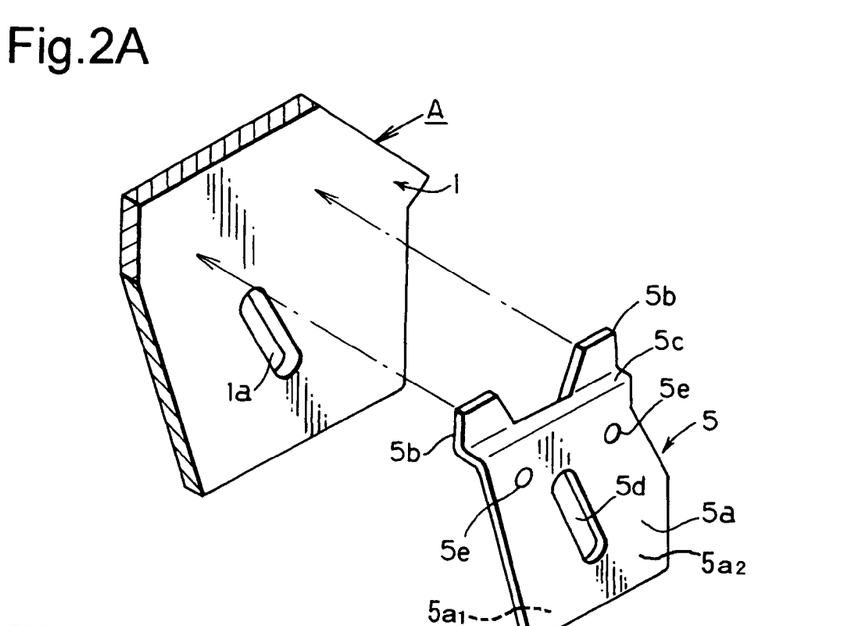
FIG. 2A is an isometric exploded view of the fixed side part and the friction plate, 2B is an isometric view of the fixed side part and friction plate with the friction plate in the fixed condition and with the friction washer separated, 2C is an isometric view of the fixed side part and friction plate to which the friction washer is fitted and which is fastened by the lock bolt.

Furthermore, as shown in FIGS. 2A, 3A and elsewhere, adjustment elongated holes 1a are formed in the fixed side parts 1. The adjustment elongated holes 1a are formed at a slant to the vertical direction. Also, if necessary the adjustment elongated holes are formed in a gradual circular arc shape in the elongated direction. The adjustment elongated holes 1a are for carrying out tilt adjustments together with the movable bracket B.

Figure 1B:
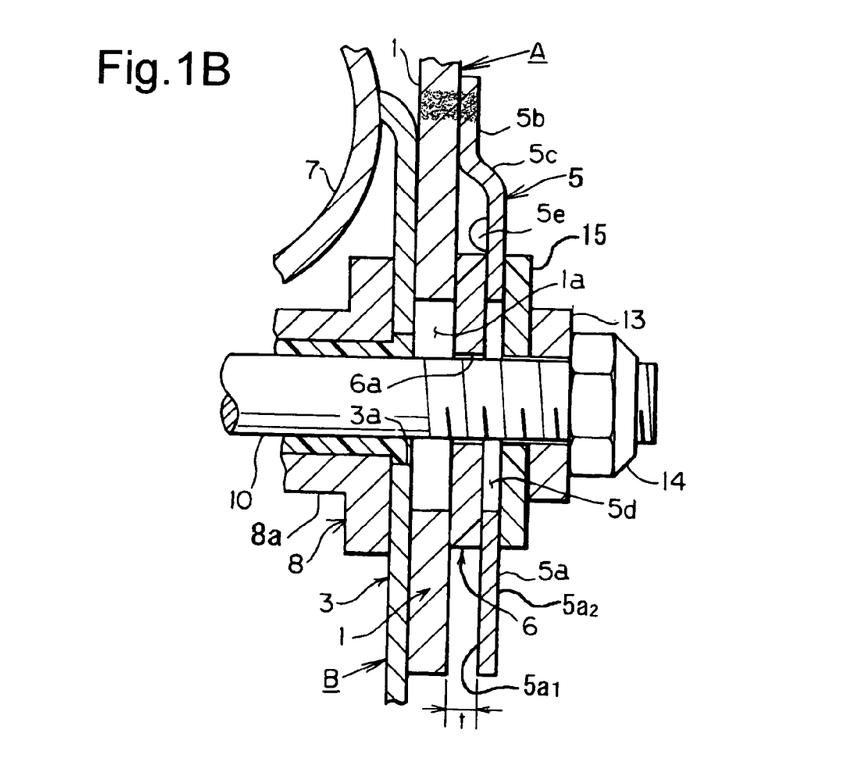
Figure 5:
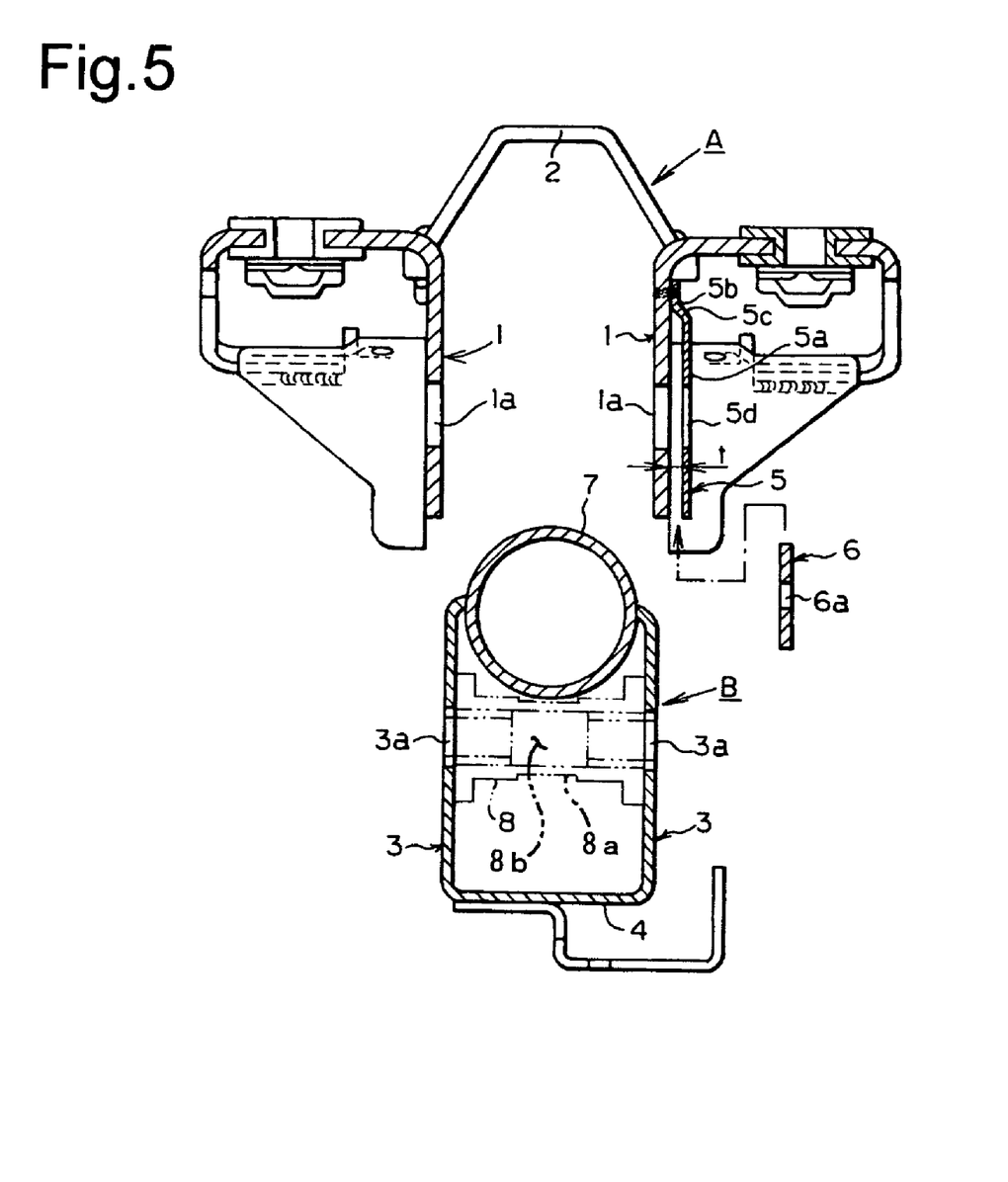
FIG. 5 is a front view partially sectioned of the fixed bracket and the movable bracket in a separated condition.

Movable side parts 3, 3 are formed on both sides in the width direction of the movable bracket B, as shown in FIGS. 1 and 5. The two movable side parts 3, 3 are connected integrally at the bottom by a movable bottom part 4. Also, a steering column 7 is sandwiched by and fixed to the top edges of the two movable side parts 3, 3 by welding. The two movable side parts 3, 3 are fitted between the two fixed side parts 1, 1 of the fixed bracket A. Telescopic adjustment elongated holes 3a, 3a are formed in the two movable side parts 3, 3 of the movable bracket B.

The telescopic adjustment elongated holes 3a, 3a are straight through holes formed in the long direction of the steering column 7 fitted to the movable bracket B (see FIG. 5). Also, the adjustment elongated holes 1a, 1a formed in the fixed side parts 1, 1 of the fixed bracket A are aligned with the telescopic adjustment elongated holes 3a, 3a of the movable bracket B, and the lock bolt 10 is passed through them, via a collar member 8 which is described later. A locking lever 11 is fitted to the lock bolt 10, so that when making tilt and telescopic adjustments the fixed bracket A and the movable bracket B are locked (fastened) or the lock is released by the rotational operation of the locking lever 11.

Figure 4A:
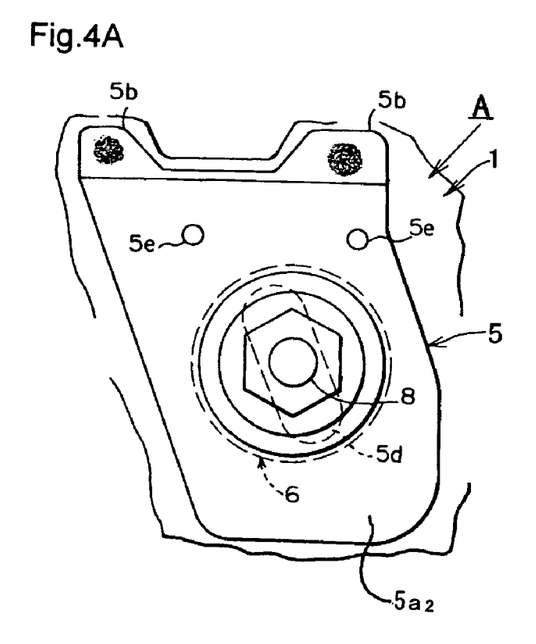
FIG. 4A is a side view showing the operation of the present invention, 4B is a front vertical section showing the operation.
Figure 4B:
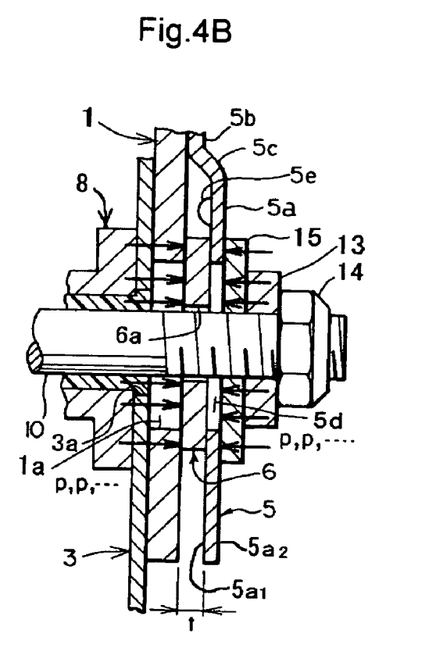

Next, the collar member 8 is an approximately cylindrical shape, and an axial through hole 8b is formed in the axial direction of a cylindrical part 8a. The collar member 8 is arranged at the position of the telescopic adjustment elongated holes 3a, 3a of the movable side parts 3, 3 of the movable bracket B, as shown in FIGS. 1, 4, and elsewhere. The lock bolt 10 passes through the telescopic adjustment elongated holes 3a, 3a and the axial through hole 8b with clearance, to connect the fixed bracket to the movable bracket B.

Figure 2B:
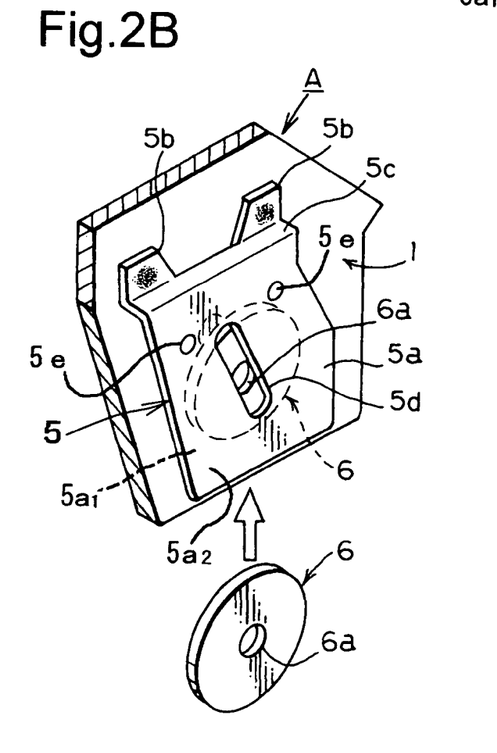
Figure 2C:
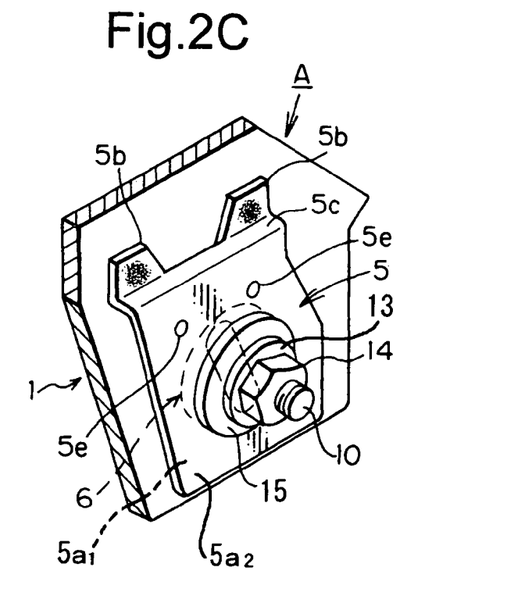

Next, the friction plate 5 is fitted and oppositely arranged at a suitable interval from at least one of the two fixed side parts 1 of the fixed bracket A, as shown in FIGS. 1A and 1B. The friction plate 5 is formed from a metal material, and is constituted by a plate shaped part 5a, an installation part 5b, and a separation part 5c as shown in FIGS. 2A and 3C. The plate shaped part 5a is formed in a plane plate shape, in an approximately parallelogram shape to suit the shape of the fixed side part 1. The plate shaped part 5a of the friction plate 5 includes an inner surface $5a_1$ and an outer surface $5a_2$, as shown in FIGS. 1 through 3 and elsewhere. The inner surface $5a_1$ is the surface opposed to the fixed side part 1 when the friction plate 5 is fitted to the fixed bracket A (see FIGS. 1B and 4B). Also, the outer surface $5a_2$ is on the opposite side to the inner surface $5a_1$ (see FIGS. 1B and 4B).

At the top edge of the plate shaped part 5a the installation part 5b is formed. Also, the separation part 5c is formed between the plate shaped part 5a and the installation part 5b. The installation part 5b and the separation part 5c are formed by bending the top of the plate shaped part 5a into an approximately L-shaped form. Specifically, the plate shaped part 5a is bent in the direction of the inner surface $5a_1$ to form an upward slope to form the separation part 5c. Then the installation part 5b is formed from the edge of the separation part 5c in the vertical direction.

The installation part 5b is the part that performs the role of fixing the friction plate 5 to the fixed side part 1 of the fixed bracket A, as shown in FIGS. 1, 2B, and 3A. The means of fixing the installation part 5b can include welding, riveting, etc., as shown in FIGS. 2B and 3A. In the embodiment the projection shaped installation part 5b of the friction plate 5 is brought into contact with the fixed side part 1 and fixed by spot welding.

Between the fixed side part 1 of the fixed bracket A and the friction plate 5 fixed to the fixed side plate 1, a gap t is formed by the separation part 5c, as shown in FIG. 1. A friction washer 6 which is described later is inserted in the gap t. The dimension of the gap t is determined by the size of the separation part 5c, but the dimension should be such that the friction washer 6 can be smoothly inserted. The friction washer 6 is made from metal, and is formed in a circular disk shape, as shown in FIG. 2B. In the center of the friction washer 6 a through hole 6a is formed. Also, the thickness dimension of the friction washer 6 is such that the friction washer 6 can be inserted into the gap t between the fixed side plate 1 and the plate shaped part 5a of the friction plate 5.

An adjustment elongated hole 5d of the same shape as the adjustment elongated hole 1a formed in the fixed side part 1 is formed in the plate shaped part 5a. The positions of the adjustment elongated hole 1a in the fixed side part 1 and the adjustment elongated hole 5d of the plate shaped part 5a match. The friction plate 5 is fixed to the fixed side part 1 by fixing means such as welding or similar (see FIGS. 2A and 2B). Furthermore, the friction washer 6 is inserted in the gap t between the fixed side part 1 and the inner surface $5a_1$ of the friction plate 5. The lock bolt 10 passes through the fixed bracket A, the movable bracket B, the friction plate 5, and the friction washer 6. By locking (tightening) or unlocking the lock bolt 10 by the rotation operation of the locking lever 11 when carrying out tilt and telescopic adjustments, the fixed bracket A and the movable bracket B are locked, or the lock is released.

Figure 6A:
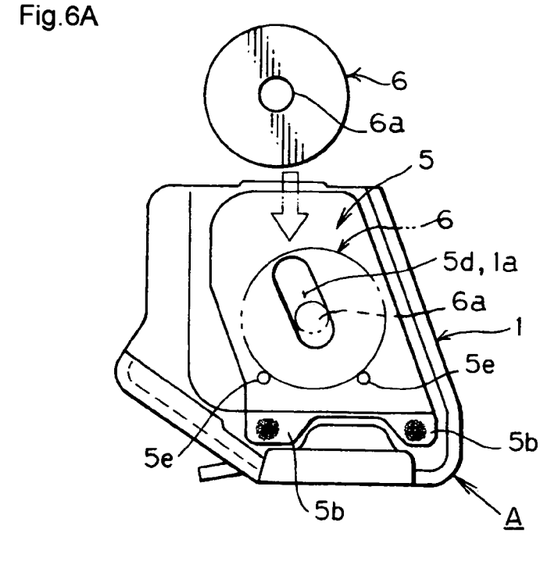
FIG. 6A is an operation view showing the friction washer about to be inserted into the gap between the fixed side part and the friction plate, 6B is an enlarged front vertical section view showing the friction washer held in the correct position by a projection.
Figure 6B:
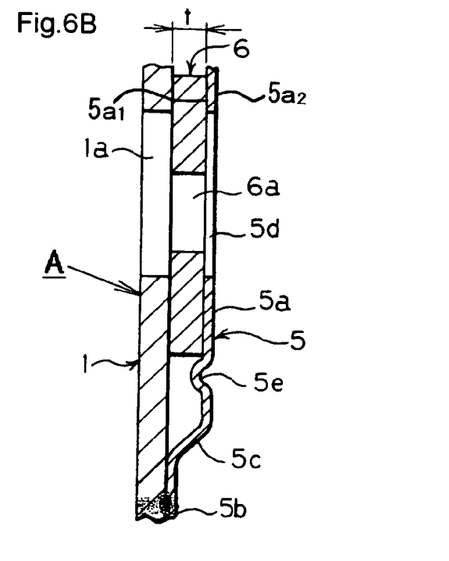

A plurality of projections 5e is formed in the plate shaped part 5a of the friction plate 5 on the inner surface $5a_1$ (the side opposite to the fixed side part), as shown in FIGS. 1B, 2A, 3A, and 3C. The projections 5e perform the role of ensuring that the friction washer 6 that is inserted into the gap t between the fixed side part 1 and the friction plate 5 is in the appropriate position. By simply dropping the friction washer 6 into the gap t between the fixed side part 1 and the friction plate 5, as shown in FIG. 6A, the projections 5e can stop the friction washer 6 in the correct position, as shown in FIG. 6B.

The correct position for the friction washer 6 is the position in which the through hole 6a of the friction washer 6 matches the position of the adjustment elongated hole 1a of the fixed side part 1 and the adjustment elongated hole 5d of the plate shaped part 5a. In particular, the adjustment elongated holes 1a, 5d are elongated holes, and the through hole 6a of the friction washer 6 is positioned so that it is within the area of the elongated holes (see FIG. 6B). Specifically, two projections 5e are formed in the plate shaped part 5a. The dropped-in friction washer 6 is supported along its perimeter at two points by the projections 5e, 5e as shown in FIG. 6A. This makes the work of passing the lock bolt 10 through the fixed side part 1, the friction plate 5, and the friction washer 6 easy, and thereby improves the efficiency of assembly.

The projections 5e are formed by pressing in a plastic deformation pressing process, or by building up the metal, or similar. Also, besides being dot shaped, the projections 5e can be formed as circular arcs along the perimeter of the friction washer 6. The process of inserting the friction washer 6 between the fixed side part 1 and the friction plate 5 is an assembly process carried out before the steering device of the present invention is assembled into an automobile. As shown in FIG. 6A, the fixed bracket A is inverted, and with the installation part 5b of the friction plate 5 towards the bottom, the friction washer 6 is dropped in.

Figures 7A, 7B:
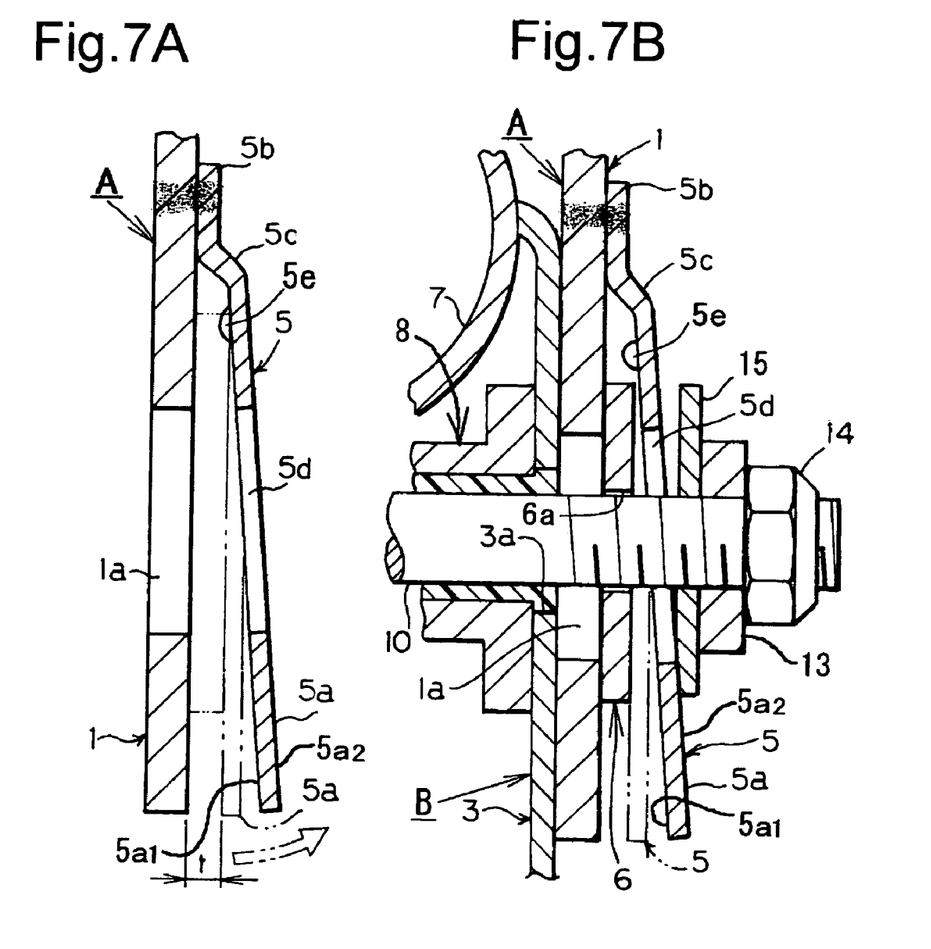
Figure 8:
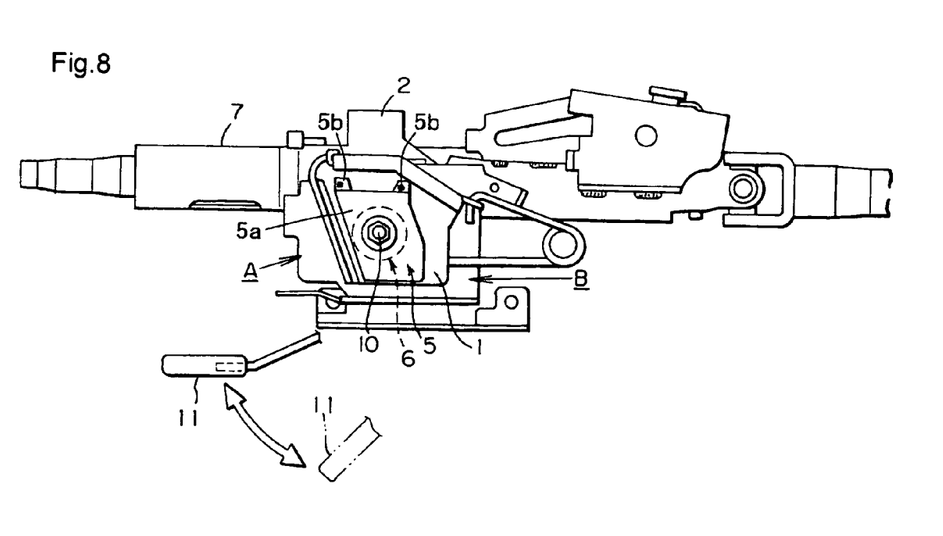
FIG. 8 is a side view of the steering device according to the present invention.

Next, the plate shaped part 5a of the friction plate 5 is configured so that the part below the installation part 5b can elastically separate relative to the fixed side part 1, as shown in FIG. 7A. In this case the gap t is equal or greater than the thickness of the friction washer 6, a gap so that the friction washer can be dropped in until it is supported by the projections 5e. In this configuration when the lock is released the lower part of the plate shaped part 5a can open up about the installation part 5b and separate from the fixed side part 1. This is possible by using spring back of the metal material. In this way, the fixed side part 1, the friction washer 6, and the friction plate 5 do not rub strongly against each other. Therefore when the movable bracket B is moved in the forward or backward directions relative to the fixed bracket A to make telescopic adjustments, there is no mutual interference between the members. Also, there is no conflict between the plate shaped part 5a of the friction plate 5 and the friction washer 6, so very good feeling can be obtained when making telescopic adjustments.

In the present invention, the two movable side parts 3, 3 of the movable bracket B are arranged to that they are sandwiched between the two fixed side parts 1, 1 of the fixed bracket A. Also, the collar member 8 is arranged between the two movable side parts 3, 3, so that the distance between the two movable side parts 3, 3 is maintained constant. The lock bolt 10 passes through the adjustment elongated holes 1a of the fixed bracket A, the telescopic adjustment elongated holes 3a of the movable bracket B, the through hole 6a of the friction washer 6, and the adjustment elongated hole 5a of the friction plate 5, and fitted so that the lock bolt 10 can be freely locked. Also, the locking lever 11 and a cam member 12 is provided between the head of the lock bolt 10 and the other fixed side part 1. On the fixed side part 1 on the other side a washer 15, a thrust washer 13, and a lock nut 14 are provided (see FIGS. 1 and 2C).

The washer 15 is made to approximately the same diameter as the friction washer 6, and is arranged on the outer surface $5a_2$ Of the plate shaped part 5a. Also, the friction washer 6 is arranged on the inner surface $5a_1$ of the plate shaped part $5a$, so that the plate shaped part $5a$ of the friction plate 5 is sandwiched by the friction washer 6 and the washer 15. In this way, by using the washer 15 together with the friction washer 6, the fastening force is transmitted to the plate shaped part $5a$ by the friction washer 6 and the washer 15, so it is possible to obtain a stronger fastening force. Also, by making the diameter of the washer 15 as large as possible, the contact area is increased relative to the non-contact area due to the adjustment elongated hole $5d$ of the friction plate 5. Therefore there is almost no loss of fastening force due to the non-contact area, and it is possible to obtain good retaining force.

Furthermore, by fitting the washer 15, there is no non-contacting area in the circumferential direction of the thrust washer 13. Therefore it is possible to uniformly transmit the fastening forces across the whole area in the circumferential direction, so the reliability of the thrust washer 13 itself is improved, and the durability can be improved. Furthermore, it is possible to make the washer 15 and the friction washer 6 from a common material and to common sizes, so the productivity can be improved. Also, the cam member 12 includes two cams, one that rotates and the other that is fixed. When the locking lever 11 is rotated the cams come closer and separate, to lock or release the lock.

Furthermore, the plate thickness of the friction plate 5 is thinner than the plate thickness of the fixed bracket A. In other words, the plate thickness of the plate shaped part $5a$ is thinner than the plate thickness of the fixed side part 1. In this way, when fastening with the lock bolt 10, the pressure contact state of the friction plate 5 and friction washer 6 is good, and a very strong fastening state can be achieved. When fastening by rotating the locking lever 11, the friction washer 6 inserted between the fixed side plate 1 and the friction plate 5 receives fastening (locking) force p, p, . . . from the fixed side part 1 and the friction plate 5 due to the axial pressure from the lock bolt 10 (see FIG. 4B).

Figure 9:
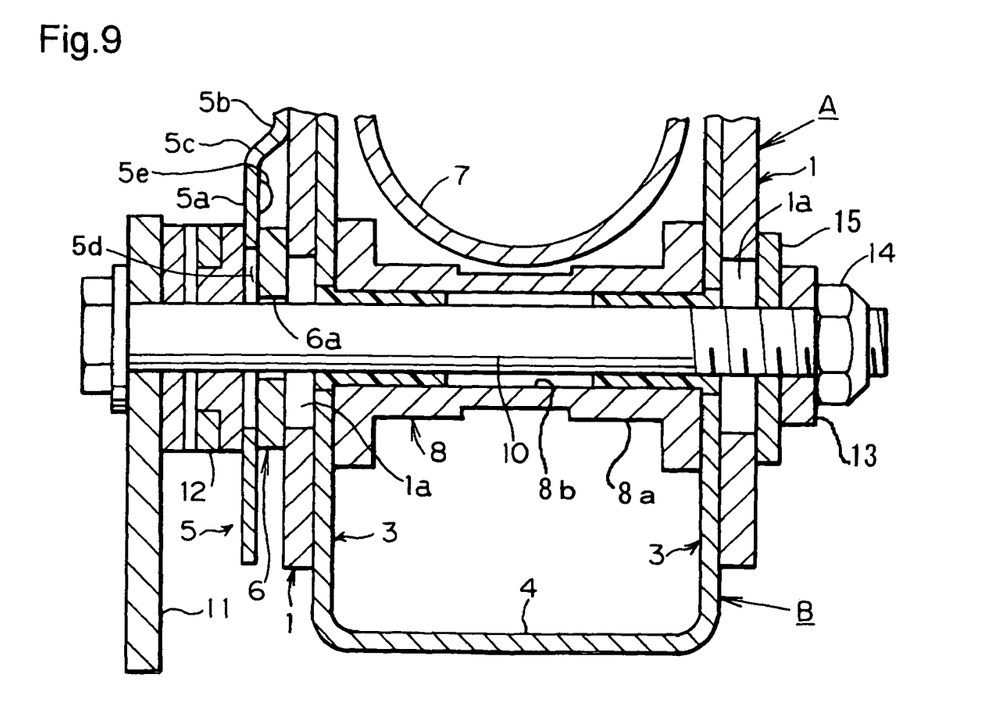
FIG. 9 is vertical section front view of an embodiment with the friction plate and the friction washer provided on the locking lever side.
Figure 10:
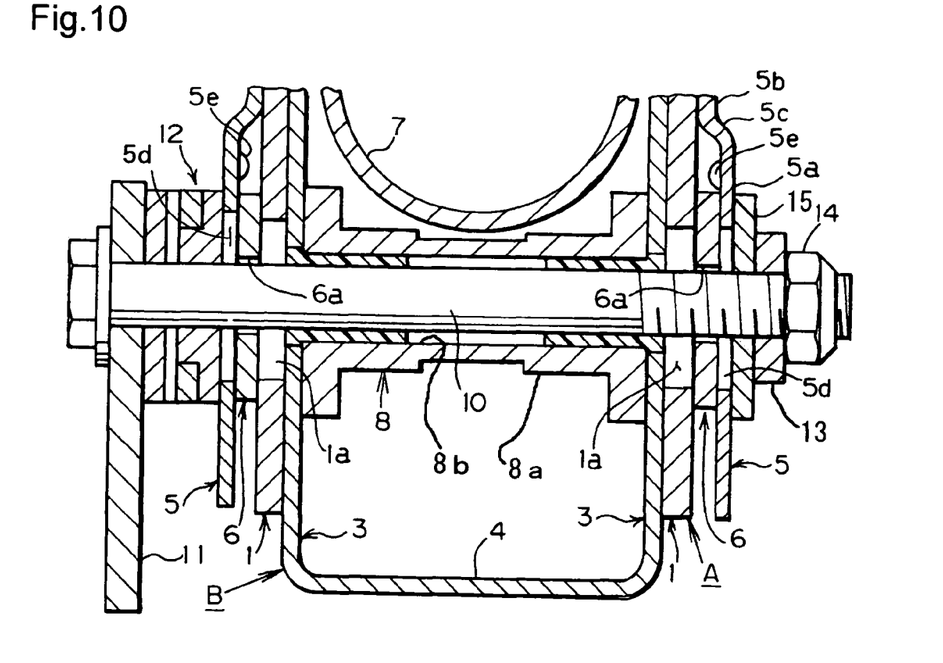
FIG. 10 is vertical section front view of an embodiment with the friction plate and the friction washer provided on both sides of the fixed bracket in the width direction.

Also, when the lock is released, the pressure between the fixed side part 1, the friction plate 5, and the friction washer 6 disappears, and the friction washer 6 is supported by the lock bolt 10 only. Therefore the movable bracket B can be moved smoothly in the axial direction relative to the fixed bracket A, to make telescopic adjustments, and good feeling can be obtained when making the telescopic adjustments. FIG. 9 shows the friction plate 5 and friction washer 6 provided on the side with the locking lever 11. Also, FIG. 10 shows the friction plate 5 and the friction washer 6 provided on both sides of the fixed bracket A in the width direction.

What is claimed is:

1. A steering device, comprising:
    a fixed bracket comprising fixed side parts on both sides in a width direction;
    a movable bracket arranged between the fixed side parts;
    a friction plate fixed and oppositely arranged with a suitable gap with respect to at least one fixed part of the fixed side parts of the fixed bracket; and
    a friction washer that is disposed between the fixed side part and the friction plate,
    wherein the friction plate comprises a plate-shaped part, an installation part, and a separation part,
    wherein the installation part is formed at a top edge of the plate-shaped part, the separation part is formed between the plate-shaped part and the installation part, the installation part and the separation part are formed by bending a top of the plate-shaped part, and the installation part is formed from an edge of the separation part in a vertical direction,
    wherein a lock bolt is passed through to couple the fixed bracket, the movable bracket, the friction plate and the friction washer in a lockable and unlockable fashion, and
    wherein dot-shaped projections for correctly positioning the friction washer are formed in the friction plate, and a gap is formed by the separation part between the fixed side part and the friction plate, the gap having a dimension wherein the friction washer to be inserted is able to drop with respect to the fixed side part until a perimeter of the friction washer is supported by the dot-shaped projections of the friction plate.

2. The steering device according to claim 1, wherein the friction plate and the friction washer are provided on both fixed side parts of the fixed bracket.

3. The steering device according to claim 1, further comprising a collar member provided between a pair of movable side parts of the movable bracket.

4. The steering device according to claim 1, wherein a washer is disposed on an outer surface of the friction plate, such that the friction plate is sandwiched between the friction washer and the washer.

5. The steering device according to claim 1, wherein a part of the friction plate below a position of fixing separates elastically from the fixed side part when the lock bolt is unlocked.

6. The steering device according to claim 5, wherein an upper edge of the friction plate is mated and fixed to an upper part of the fixed side part.

7. The steering device according to claim 5, wherein a plate thickness of the friction plate is less than a plate thickness of the fixed bracket.

8. The steering device according to claim 5, wherein the friction plate and the friction washer are provided on both fixed side parts of the fixed bracket.

9. The steering device according to claim 5, further comprising a collar member provided between a pair of movable side parts of the movable bracket.

10. The steering device according to claim 5, wherein a washer is disposed on an outer surface of the friction plate, such that the friction plate is sandwiched between the friction washer and the washer.

11. The steering device according to claim 1, wherein an upper edge of the friction plate is mated and fixed to an upper part of the fixed side part.

12. The steering device according to claim 11, wherein a plate thickness of the friction plate is less than a plate thickness of the fixed bracket.

13. The steering device according to claim 11, wherein the friction plate and the friction washer are provided on both fixed side parts of the fixed bracket.

14. The steering device according to claim 11, further comprising a collar member provided between a pair of movable side parts of the movable bracket.

15. The steering device according to claim 11, wherein a washer is disposed on an outer surface of the friction plate, such that the friction plate is sandwiched between the friction washer and the washer.

16. The steering device according to claim 1, wherein a plate thickness of the friction plate is less than a plate thickness of the fixed bracket.

17. The steering device according to claim 16, wherein the friction plate and the friction washer are provided on both fixed side parts of the fixed bracket.

* * * * *